INVENTORS
ERNEST G. ANGER
VICTOR E. YOUNG
BY

2,933,670

GENERATOR FIELD EXCITATION CIRCUITS

Ernest G. Anger, Wauwatosa, and Victor E. Young, Milwaukee, Wis., assignors to Square D Company, Detroit, Mich., a corporation of Michigan Application October 4, 1956, Serial No. 613,974

5 Claims. (Cl. 322—28)

The present invention relates to generator field excitation circuits and more particularly, to generator field excitation circuits in regulating systems.

In voltage, speed or position regulator systems, an 8 to 1 speed range or the equivalent has been established as a standard. In the present embodiment an adjustment in speed is provided by regulating the voltage supplied to a motor by a generator wherein the generator output voltage is controlled by the generator field connected in a field excitation circuit controlled by the output of a feedback regulating circuit. The latter circuit form is optional and the field may be regulated by the generator output voltage, the rotational speed or position of a shaft, etc., where the output unit is supplied power from the generator.

In automatic regulator systems for voltage speed or positioning, the inherent characteristic of the generator, namely: residual flux in the field at no load, regulating circuit components particularly a magnetic amplifier being unable to cut off completely or a desirable control characteristic for response, demand the use of "field forcing" which in the past has required the provision of bucking field windings in the generator.

The use or employment of a bucking field in a generator involves a substantial additional cost as well as additional increase in wattage required in the control field windings thereby increasing the power required from the control field excitation circuit; for in addition to the bucking field winding which subtracts from the space previously available for the control field winding, the control winding must include an additional field strength at least equal to the bucking field windings to produce the flux necessary for rated armature voltage. Another disadvantage is that a bucking field acts as a short circuit to its power supply under transient conditions, thereby increasing the overall time constant of the generator field. Further, the need of bucking field structure in reworking existing voltage speed or position regulating systems to make them automatic is a major expense since the generator used in the prior systems avoided including a bucking field as too costly an item to compensate for the residual flux in the field at no load and since no additional flux was produced for the system it usually did not include an amplifier in the excitation circuit.

Since an automatic regulator system would be unable to function within desirable range due to the minimum field established by the residual flux and the amplifier and the desirability of negative forcing, two alternatives remain: either supplying a new generator having a bucking field or reconstructing the generator field to include a bucking field winding and additional field windings.

The present invention is directed to a field excitation circuit which may be used in regulating systems of the type described, providing all the desirable functions of the bucking field, namely: compensating for residual flux; inability of the amplifier, particularly a magnetic amplifier, to cut off completely; and "forcing" of the generator field voltage, without the inherent disadvantages enumerated concerning the bucking field winding structure.

The present invention as shown provides a regulated excitation circuit for a generator supplying a regulated voltage output in which a bucking or opposing voltage is included in a generator field circuit. The generator includes an armature mechanically coupled to a source of driving power, e.g., a motor generator combination, producing a regulated voltage output. The excitation circuit includes circuit means for connecting the field to a primary excitation source having output voltage proportional to the voltage produced by the armature. Specifically, this may be the armature voltage in a self-excitation system or a voltage derived from a correlated system having a common reference and providing a feedback or reference which is proportional to the voltage of the generator armature.

Regulating circuit means for measuring either the armature voltage or circuit means regulated by the armature voltage couples the regulated output quantity in the form of a feedback or regulating voltage to the excitation circuit where it is added to the primary excitation voltage for controlling the field excitation current and the generator voltage output. Since the feedback or error signal would be of insufficient amplitude to provide the regulating power, in the excitation circuit to producing the required regulating voltage, a magnetic amplifier has been inserted in the regulating circuit for amplifying the error or feedback signal. A magnetic amplifier represents a common expedient for this purpose, however, it has been specifically designated as such since its characteristics are typical or more aggravating since the magnetic amplifier does not completely cut off and its size or range presents a major cost or expense factor for higher amplification requirements.

A D.C. voltage source, preferably a bridge rectifier circuit connected to an A.C. supply and including preloading resistors, is connected in series with the field winding and in opposition to the primary excitation voltage source. The bucking or opposed voltage in the excitation circuit provides a negative bias for the generator field winding decreasing the voltage produced by the primary excitation voltage in the excitation circuit by a fixed amount which is predetermined by the minimum regulating voltage required to retain unidirectional operation of the regulating circuit or magnetic amplifier over the desired range of the generator operation including the minimum desirable output and excess range necessary for forcing the field excitation change at any armature voltage.

The range of the regulating circuit means or magnetic amplifier is primarily determined by the voltage necessary to bring the field up to 100% rated field current; however, forcing of the field in either positive or negative direction is desirable to decrease the response time of the generator for regulating voltage variations signalled by the regulated output quantity. A change in regulated quantity may be produced by variations in load, speed or position or any other variation evidenced by a change in error, feedback signal or regulating voltage.

The generator field excitation curve may be made adjustable for optimum performance by the insertion of a field ballast resistor in series with the generator field winding. Optimum performance includes the maintaining of the excitation curve above the algebraic sum of the primary excitation voltage $V_a$ and the bucking voltage $V_b$ consistent with the factors of: a minimum bucking voltage; the smallest magnetic amplifier having a range or capacity including field cut-off at low ranges of generator operation at one end, rated field voltage at the other end and sufficient additional range to produce field forcing. A restatement of the above would be to establish a curve of primary excitation voltage proportional to the regulated armature voltage and algebraically added to the minimum bucking voltage which would be necessary to maintain the generator excitation curve within the minimum required unidirectional operation of the regulating voltage circuit, or the optimum portion of the magnetic amplifier control characteristic of the smallest capacity magnetic amplifier having the necessary range of operation. It is desirable that the range of the regulating circuit or magnetic amplifier include sufficient capacity to provide forcing at any generator armature voltage as well as a regulating voltage amplitude sufficient to raise the field excitation voltage to 100% of rated field voltage at 100% rated armature voltage, and field excitation current cut off at the lower range of the generator operation where the regulating voltage raises the algebraic sum of the primary excitation voltage and the bucking voltage to maintain excitation current or maintain excitation current when the excitation curve $V_a$ minus $V_b$ tends to reverse or go negative. It is an object therefore, of the present invention to provide a generator field excitation circuit having the foregoing features and advantages.

Another object is to provide for operation of a generator over its complete range.

A further object of the invention is the provision of a generator field excitation circuit providing the proper field excitation over the whole range of generator operation.

Still another object is to provide a field excitation circuit for operating a generator, having its field supplied by a voltage proportional to the armature voltage, over the complete range of operation at any armature voltage.

A still further object of the present invention is the provision of a generator field excitation circuit for forcing or an excess range of excitation voltage at any generator armature voltage to decrease the response time to a change in regulated output of the generator.

Figure 1:
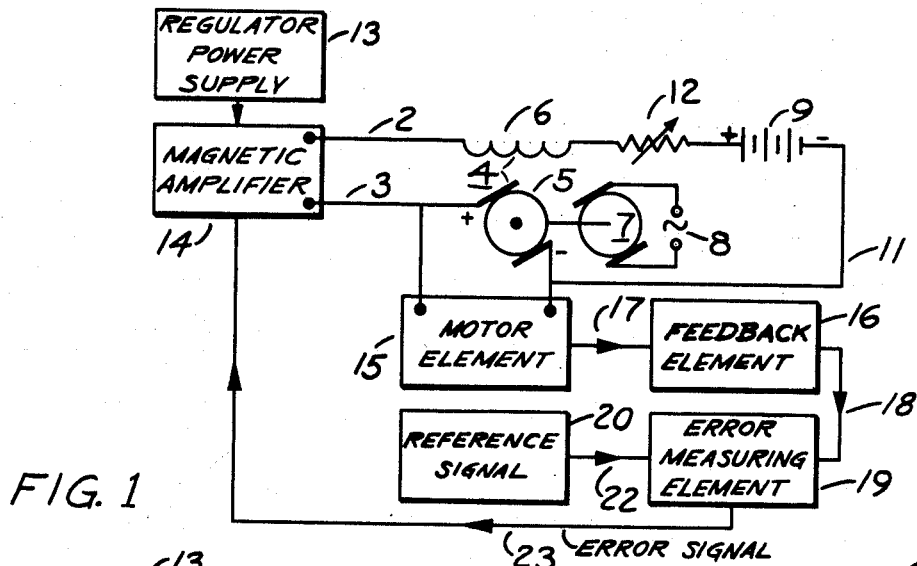
Fig. 1 is a diagrammatic view of one embodiment of a generator control involving this invention.

Referring now to the drawings wherein like reference characters designate like or corresponding parts throughout the several views, there is shown in Fig. 1 which illustrates a preferred embodiment, a regulator system including a generator 4 having a regulated output voltage which may control the rotational speed or position of a shaft, etc., driven by a motor element 15, wherein the circuit of Fig. 1 is directed to a self excitation circuit for the generator field 6. The circuit coupling the field to the generator armature is also connected to the output of the magnetic amplifier 14 and includes a negative field biasing voltage or bucking voltage 9 and ballast resistor 12 connected in series therewith. The generator field voltage therefore at any instant is the algebraic sum of the regulating voltage or amplifier voltage $E_f$ and the regulated armature voltage $V_a$ less the opposing or negative bias voltage 9.

The optimum and most economical operation of the magnetic amplifier described above requires a proper match of the rated field operating voltage to the armature voltage produced which is employed for self-excitation. To facilitate this optimum match in spite of variations in manufacture, an adjustable field ballast resistor is added in series with the field. The total voltage across the series combination of the field and resistor then is represented by $V_f$ in the graph and may therefore be adjusted to insure the optimum operation illustrated. This adjustment is of especial importance to insure that required field voltage is always in excess of the self-excitation voltage from the combination of armature and bucking voltages by an amount at least equal to the minimum controllable output of the amplifier. Otherwise excitation could sustain itself without need of amplifier increase and run-away out of control. If sufficient allowance is made in design and choice of amplifier range the ballast resistor is not needed.

The source of driving power has been shown as a motor 7 mechanically coupled to the generator armature 5 and electrically coupled to the alternating current power source 8. The regulated output voltage of the generator 4 is coupled from the armature terminals to the regulated circuit or motor element 15 and connected in shunt to the field excitation circuit by the line 11 connected to the bucking voltage source 9 and line 3 connecting the positive generator terminal to the lower terminal of the magnetic amplifier 14.

The regulator system has been shown in block diagram wherein the output of the motor element 15 is coupled to the feedback element 16 through the line 17. Since the regulated quantity may be either the output voltage of the generator, rotational speed of the motor element, of the position of the motor element, or an element driven by the motor, line 17 represents either a mechanical or electrical input to the feedback element 16.

In the regulating system, the feedback element 16 provides a means of measuring the actual performance level of the regulated quantity i.e., voltage speed or position and is capable of measuring or sensing the quantity to be regulated and producing a signal which bears a fixed relationship to the measurement, e.g., a signal voltage proportional to the level of the regulated quantity. Line 18 couples the output of the feedback element 16 to the error measuring element 19 having another input derived from the reference signal element 20.

The reference 20 customarily is a voltage which should be stable, carefully regulated not to fluctuate with line voltage load or temperature changes to provide a constant potential source from which an adjustable signal may be derived to preselect the performance level of the regulated output quantity. The reference signal is coupled to the error measuring element 19 through the line 22 where a comparison is made of the actual signal fed into the circuit 19 by the feedback element 16 and the reference signal representing the desired result. The difference resulting from the comparison produces an error signal which is coupled to the magnetic amplifier 14 through the line 23 to provide the control signal for the control windings of the magnetic amplifier 14, the grid of a grid controlled gaseous discharge device or other amplifiers wherein the magnitude of the error signal determines the amplifier output voltage or the regulating voltage $E_f$.

A source of regulator power supply 13 is coupled to the magnetic amplifier, specifically, the load windings, to produce a regulating voltage controlled by the error signal and added to the armature voltage to control the field excitation. The graph of the field voltage versus armature voltage up to rated values has been shown in Fig. 3 to illustrate field excitation under full load and no load conditions as shown by the curves FL and NL, and the portion of field voltage supplied by the regulating voltage output of magnetic amplifier 14 for full load (FL) at rated field and armature voltage by the typical magnetic amplifier control characteristic 45. The straight line curve $(V_a - V_b)$ represents the percentage of field voltage impressed by the armature when connected to the field self-excitation circuit and including the bucking voltage 9 in the series therewith. The magnetic amplifier control characteristic 45 has been shown for only 100% or rated armature voltage $V_a$; however, it is understood that it supplies the difference between $V_a$ minus $V_b$, the excitation voltage, as shown by the curves NL or FL for any armature voltage $V_a$.

In the operation of the circuit shown in Fig. 1, motor 7, supplied by an A.C. power source 8, is mechanically coupled to the armature 5 of the generator 4 to drive the armature in the field provided by the field windings 6. The field excitation circuit produces a current in the field winding 6 by the regulating output voltage of the magnetic amplifier 14 which exceeds the bucking voltage 9, as the error signal derived from the error measuring element 19 drives the magnetic amplifier to produce higher amplitude output than the bucking voltage, tending to increase the feedback signal and decrease the error signal. As the field produces flux in the armature windings, the armature voltage provides the primary source of field excitation and the magnetic amplifier 14 regulates the field voltage VF supplying the additional voltage necessary to raise the algebraic sum of the armature voltage and the bucking voltage.

Figure 3:
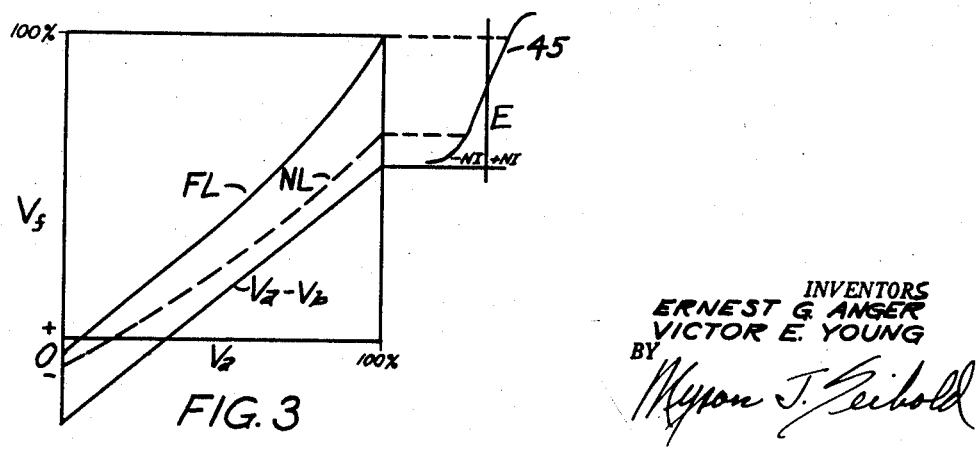
Fig. 3 shows the characteristic curves of elements of this invention.

Referring to Fig. 3, the full load (FL), no load (NL), and magnetic amplifier control characteristic illustrate the required magnetic amplifier output over the range of generator and armature voltages which remains within desired portion of the amplifier control characteristic curve. As the regulated system builds up in voltage along the full load or no load curve or any loading curve, the armature voltage of the generator 4 increases until the reference signal setting is approached by the output of the motor element as measured by the feedback signal 18; as can be seen by reference to the graph shown in Fig. 3, the magnetic amplifier provides a regulating voltage which is added to the armature voltage in the field excitation circuit to overcome the bucking voltage 9 and produce the additional field excitation for forcing excitation voltages required for any load condition or armature voltage. The magnetic amplifier therefore need only be of sufficient capacity to supply the difference between rated $V_f$ for any armature voltage minus the bucking voltage although it is desirable to provide a sufficient range for negative or positive forcing of the field excitation. The error signal input to the magnetic amplifier controls its output over the range of loading conditions for any armature voltage in which the feedback element 16 senses the actual performance level to control the amplifier output or in regulating voltage in accordance with the preselected reference performance level.

Figure 2:
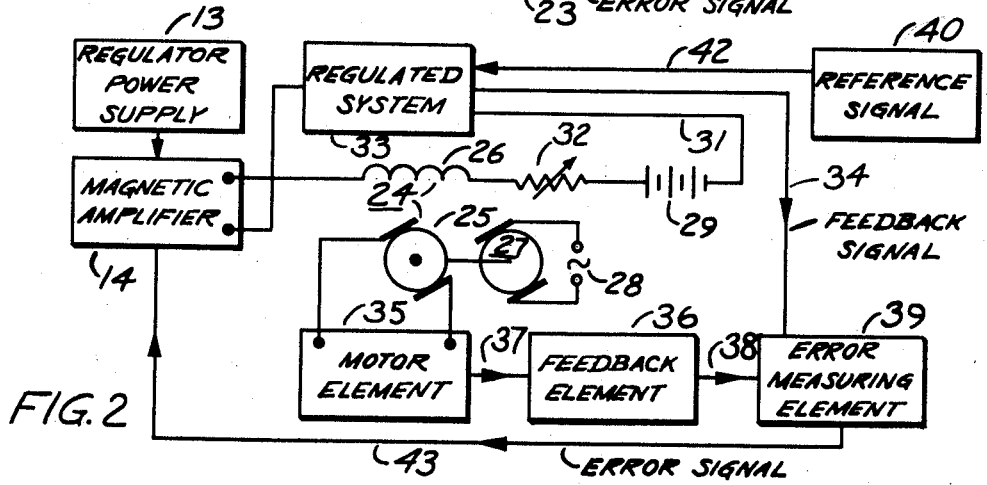
Fig. 2 is a modified view of a circuit arrangement involving this invention.

The regulator system shown in Fig. 2, in contrast with the self-excitation embodiment shown in Fig. 1, discloses a generator whose field is supplied by a primary excitation source derived from a correlated regulated system 33. The correlated system 33 refers to any regulated system in which the quantity regulated bears a fixed relationship to the regulated quantity of the present system. This has been illustrated in Fig. 2 by supplying a reference signal 40 to the regulated system 33 via line 42 wherein the regulated system 33 provides a feedback signal along the line 34 used as a reference in the error measuring element 39 and compared to the feedback signal derived from the motor element 35.

Included in series in the excitation circuit of the generator field 26 are: the bucking voltage 29, the adjustable ballast resistor 32 and the regulating voltage output of the magnetic amplifier 14. Comparing the circuits of Figs. 1 and 2 it may be readily seen that the systems differ primarily in that the correlated regulated system provides the primary source of excitation rather than self-excitation circuit of Fig. 1. However, the primary source of excitation found in the regulated system 33 preferably, but not necessarily, is a generator armature as shown in Fig. 1, and may be any regulated voltage source proportional to the voltage of armature 25 having sufficient capacity for supplying the primary excitation for the field 26.

In the operation of Fig. 2, power is supplied to the motor 27 from an A.C. source 28 for driving the armature 25 of the generator 24. The generator output is coupled to the motor element 35 producing a regulated output quantity which is coupled to the feedback element 36 through the line 37. Feedback element 36 measures the actual performance level of the motor element 35 to produce an output signal bearing a fixed relationship to the measurement and coupled to the error measuring element 39. The feedback signal from the present system is compared with the feedback signal 34 having a fixed relationship to the output of the correlated system. The correlated system 33 is in turn regulated to the preselected performance level of the reference signal source 40. The error signal or difference resulting from the comparison of the two feedback signals fed into the error measuring element 39 is coupled to the magnetic amplifier through the line 43 to control the amplifier output. The field excitation circuit is connected to the magnetic amplifier 14 to add the regulating signal voltage to the primary source of field excitation provided by the regulated system 33. Preferably the field ballast resistor 32 is adjusted to maintain the amplifier voltage fairly constant throughout the control range of the regulator with the generator operating under no load conditions.

Assuming that the complete system of Fig. 2 is started under any load condition, the magnetic amplifier 14 will provide the field excitation voltage necessary to overcome the negative bias or bucking voltage 29 and produce a current through the field winding 26 to supply an output voltage of the proper polarity to the motor element from the armature of the generator 24. Since the error measuring element 39 provides an error signal which is the result of the comparison of the feedback signal derived from the regulated system 33 and the feedback signal indicating actual output, the magnetic amplifier will produce a regulated voltage measured by the difference between the curve under the particular load condition and the excitation voltage provided by the regulated system 33 less the bucking voltage 29 and transient forcing voltages. The graph shown in Fig. 3 would be applicable in the same manner as described in Fig. 1 except that the voltage indicated by $V_a$ would be the excitation voltage supplied by the regulated system 33.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. In combination, a generator having a main field winding and an armature mechanically coupled to a source of driving power for producing a regulated voltage output, an excitation circuit means connecting said field to a primary voltage source having a voltage output proportional to the voltage produced by said armature, circuit means connected in series with the first means and arranged for adding a regulating voltage source to said primary excitation voltage for controlling the field excitation current and the generator voltage output, a direct current voltage source connected in series with said field winding, said primary source, and said regulated voltage source and connected to oppose the voltages of the primary voltage source and the regulating voltage source for decreasing the effective voltage produced by said primary excitation voltage source in said excitation circuit by a fixed amount predetermined by the minimum regulating voltage required to retain unidirectional operation of the regulating circuit means over the desired range of generator operation.

2. In combination, a generator having a main field winding and an armature mechanically coupled to a source of driving power for producing a regulated voltage output, an excitation circuit means connecting said field to a primary voltage source having a voltage output proportional to the voltage produced by said armature, regulated circuit means coupled to said armature output and producing a regulated output quantity, regulating circuit means for measuring said output quantity to produce a regulating voltage, circuit means responsive to the regulating voltage arranged for adding a regulating voltage output to said primary excitation voltage for controlling the field excitation current and the generator voltage output, a direct current voltage source connected in series with said field winding and connected in series with and in opposition to the outputs of the primary excitation voltage source and the regulating voltage for decreasing the voltage produced by said primary excitation voltage source in said excitation circuit by a fixed amount predetermined by the minimum regulating voltage required to retain unidirectional operation of the regulating circuit means over the desired range of generator operation including the minimum desirable voltage output and excess range necessary for forcing of the excitation change at any armature voltage.

3. A regulator system including a generator coupled to a source of driving power for producing a regulated output voltage, said generator having an armature and a main field winding, a self excitation circuit for said field winding including a circuit means connecting said field in shunt with said armature providing a primary source of excitation voltage for the field winding, a source of direct current voltage connected in the circuit in series with said field and in opposition to the primary excitation voltage to decrease the primary excitation voltage across said field, regulated circuit means connected to said armature having an output, feedback circuit means coupled to said regulated circuit means for deriving a signal voltage proportional to the actual output of said regulated circuit means, a reference voltage source for preselecting the output level of said regulated circuit means, error measuring circuit means including circuit means coupling said feedback and reference signal voltages to said error measuring circuit means for comparing said signal voltages and deriving a regulating signal voltage proportional to the difference in said feedback and reference signal voltages, an amplifier including a source of power for amplifying said regulating signal voltage to produce a regulating output voltage, amplifier output circuit means for coupling the regulated output voltage of the amplifier in series with said field winding and said source of direct current whereby the regulating output voltage controls the field excitation, said direct current voltage being of a predetermined magnitude whereby unidirectional operation of said amplifier produces regulating voltage for controlling said generator over its complete range of operation.

4. In a regulator system for controlling the energization of a main field of a generator that has a driven armature for producing a regulated output voltage, the combination comprising; a primary current and voltage source connected to said field, means including a magnetic amplifier having an output winding in series circuit with the primary source and field for energizing the field with a voltage proportional to the regulated output voltage, means in series circuit with the primary source, the field and the output winding of the amplifier arranged to oppose the output voltages of the primary source and magnetic amplifier and means in said series circuit for varying the current flow in said circuit.

5. In a regulator system for controlling the energization of a main field of a generator that has a driven armature for producing a regulated output voltage, the combination comprising; circuit means connecting the armature to the field to render the generator self-exciting, a magnetic amplifier connected in series with said circuit means and a second source of voltage connected in series with the amplifier and field and in voltage opposition thereto for reducing the self-exciting effect of the armature on the field.

References Cited in the file of this patent
UNITED STATES PATENTS

| | | |
|---|---|---|
| 1,843,250 | Spencer | Feb. 2, 1932 |
| 2,525,451 | Graves | Oct. 10, 1950 |
| 2,663,833 | Fisher | Dec. 22, 1953 |
| 2,781,487 | Kennedy | Feb. 12, 1957 |